United States Patent [19]
Boone et al.

[11] 3,937,237
[45] Feb. 10, 1976

[54] UNIVALVE IRRIGATION SYSTEM

[75] Inventors: Ralph D. Boone; Charles Griffin, both of Clovis, N. Mex.

[73] Assignee: Lockwood Corporation, Gering, Nebr.

[22] Filed: Feb. 3, 1975

[21] Appl. No.: 546,211

[52] U.S. Cl. ................................. 137/1; 137/344
[51] Int. Cl.² ...................................... A01G 25/02
[58] Field of Search ........ 137/1, 344; 239/177, 212, 239/213

[56] References Cited
UNITED STATES PATENTS

| | | | |
|---|---|---|---|
| 3,302,656 | 2/1967 | Boone | 239/177 X |
| 3,606,161 | 9/1971 | Paul | 137/344 X |
| 3,831,623 | 8/1974 | Boone | 137/344 |

*Primary Examiner*—Henry T. Klinksiek
*Attorney, Agent, or Firm*—Wendell Coffee

[57] ABSTRACT

A pivot or circle type irrigation system has a single hydraulic cylinder upon each vehicle to provide motive force to that vehicle. Two hydraulic tubes extend the length of the system and each hydraulic tube is connected to one side of each cylinder without valves. The cylinder movement is blocked if the vehicle upon which it is mounted is detected to be ahead by an alignment system. Hydraulic fluid is pumped into one tube until an increase of pressure indicates that all of the cylinders are cockablock and then the tubes are reversed and hydraulic fluid is pumped into the other line until, again, a rise in pressure indicates that all of the cylinders are cockablock.

9 Claims, 4 Drawing Figures

UNIVALVE IRRIGATION SYSTEM

CROSS-REFERENCE TO RELATED APPLICATIONS:

None. However, a Disclosure Document No. 032273 was filed on May 20, 1974.

BACKGROUND OF THE INVENTION:

1. Field of the Invention

This invention relates to agricultural irrigation and more particularly to moving an agricultural irrigation system and maintaining it in alignment as it is moved.

2. Description of the Prior Art

Irrigation systems which move in a circle around a pivot are well known and commercially available on the market. Also, there are many arrangements for driving the systems and maintaining them in alignment as they are driven. There has been previously patented a system where a taut line was stretched from one end of the system to the other and the individual vehicles prevented from moving by dropping a block into a mechanical movement system, Boone U.S. Pat. No. 3,302,656.

Previous systems have been operated by hydraulics and in such systems, traditionally, a single line extends to each vehicle and two valves are required on each vehicle. One of these valves throttles the fluid into the power cylinder for alignment purposes and the other valve switches the fluid under pressure to one side or the other of the piston.

SUMMARY OF THE INVENTION

1. New and Different Function

We have provided a system which is extremely simple and, therefore, trouble-free. It is driven by hydraulics, but no valves whatsoever are located on the vehicles themselves; only one main valve is used on the entire system. The simplicity of the system results in an extremely inexpensive system as well as one which is trouble-free.

In our system, hydraulic fluid is pumped into one side of the piston located on each vehicle until the piston moves for its full permitted stroke. When all of the pistons have moved their full permitted stroke, the hydraulic pressure increases inasmuch as there is no further place for it to go. After this increase in hydraulic pressure, the pressure in two tubes is reversed. The pressure is pumped to the other side which reverses all of the pistons. If a vehicle is forward of its proper position in line, the piston is blocked from movement and, therefore, the piston moves only slightly or not at all.

2. Objects of the Invention

An object of this invention is to move agricultural irrigation pipe and maintain it in alignment as moved.

Further objects are to achieve the above with a device that is sturdy, compact, durable, lightweight, simple, safe, efficient, versatile, and reliable, yet inexpensive and easy to manufacture, install, adjust, operate, and maintain.

Other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 2:
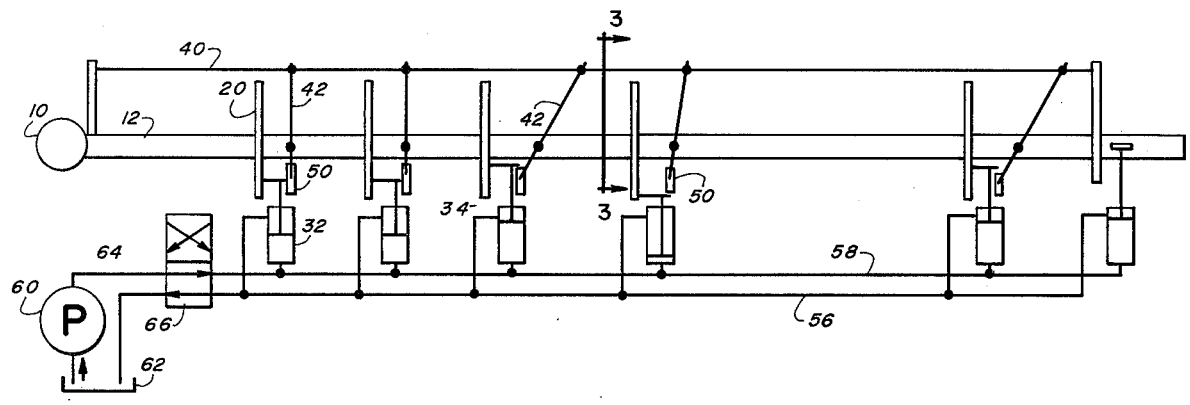
FIG. 2 is an enlarged schematic representation of one embodiment of this system.
Figure 1:
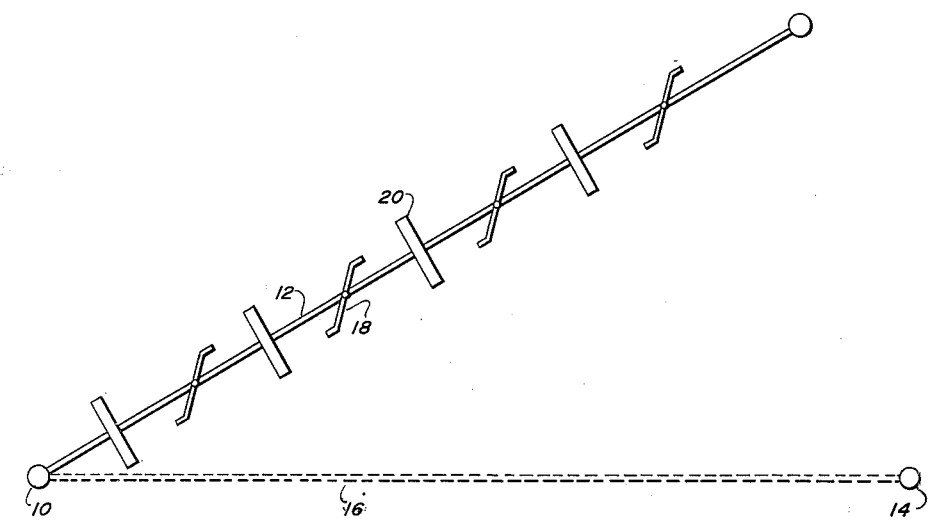
FIG. 1 is a schematic representation of the system according to this invention.

Referring to the drawing and more particularly to FIGS. 1 and 2, there may be seen an irrigation system. This irrigation system has central pivot 10 about which main irrigation pipe 12 is attached. A well or other source of water under pressure 14 provides water by conduit 16 to the pivot 10. Sprinklers 18 on the pipe provide means for sprinkling the water upon land. The pipe is supported by a plurality of vehicles 20. As described to this point, the system is conventional and commercially available upon the market.

Figure 3:
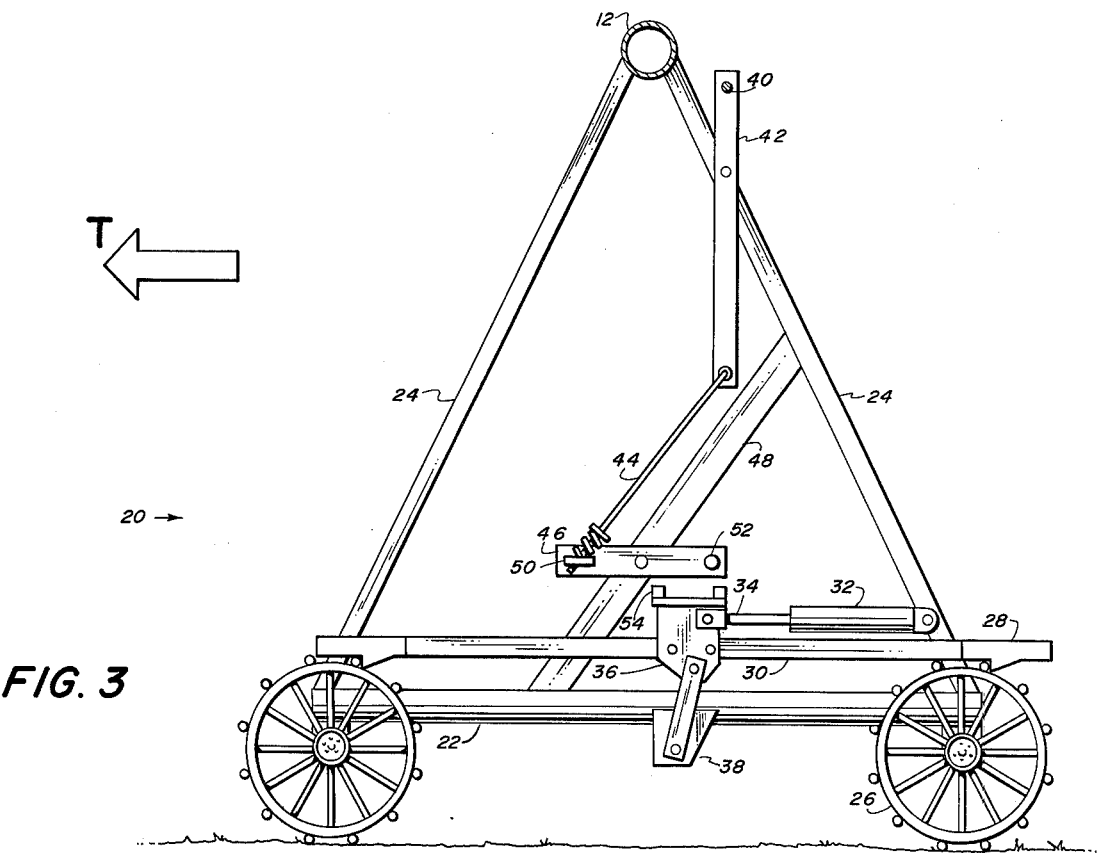
FIG. 3 is a side elevational view of one vehicle according to an embodiment of this invention taken substantially on line 3—3 of FIG. 2.

Referring to FIG. 3, each vehicle has a frame including main beam 22 and two struts 24, the struts extending from the ends of the main beam 22 to support the pipe 12. These are generally in a triangular shape as shown. Two wheels 26 are at either end of the main beam 22. The wheels are driven by dogs 28 upon drive rods 30. The drive rod is driven by fluid power or hydraulic cylinder 32. Piston rod 34 of the cylinder 32 is connected to head 36. The two driving rods 30 are connected to the head 36 and the head is supported by oscillating element 38. The lower portion of the element 38 is pivoted to an ear depending from the main beam 22. It will readily be understood that as hydraulic pressure is connected to either end of the hydraulic cylinder 32, the vehicle will be driven forward in the direction of arrow T. Although the additional material to this point may not be typical or conventional, such hydraulic mechanical drives for irrigation systems are not novel.

Alignment wire 40 is stretched from one end of the system to the other. Arm 42 is pivoted at about its center to one of the struts 24 on each vehicle 20. The alignment wire 40 is attached to the upper extremity of the arm 42. The lower extremity of the arm 42 is attached to block connector 44. Block arm 46 is pivoted at its middle to support 48 which extends from strut 24 to main beam 22. Block 50 is attached to one end of the block arm 46 and counterweight 52 is attached upon the other.

As seen in the drawing and particularly FIG. 3, if the vehicle is in line or behind the other vehicles as determined by the relative position of the vehicle 20 to the alignment cable 40, the block connector 44 will be at an acute angle to the block arm 46 and will hold the block 50 above block head 54 on top of the head 36. However, it may be seen that if the vehicle 20 moves forward, which is to say in the direction of travel T, with respect to the alignment as indicated by the position of the alignment wire 40, the block connector 44 will move to a position approaching right angles to the block arm 46 which will push the block 50 down. It will be seen that as the block 50 is pushed down, it will engage the block head 54. Also, it will engage behind the catch upon the block head 54 and, therefore, block the block head 54 and the head 36 to which it is attached in the forward position, which is to say it will block the head with the piston rod 34 fully extended. Therefore, if reasonable hydraulic pressure is applied to the cylinder 32, the head will not move. The pressure applied to the hydraulic cylinder is normally enough to move the wheels forward, but not enough to bend the middle of the frame, and the vehicle will not be moved as long as the block 50 is in place.

It may be seen that no close machine tolerences or the like need be applied to the blocking system. I.e., if the head has an inch or two play or movement when the block 50 is in place, this actually has an advantageous effect. I.e., a slight movement, such as one inch, is not enough for another lug on the wheel 26 to be engaged by the dog 28 and, therefore, there is no forward movement. On the other hand when the other vehicles have moved forward so the alignment wire 40 is again in a position to lift the block 50, as hydraulic pressure is applied to the cylinder 32, there will be no force or pressure upon the block 50 and, therefore, it will lift easily from the block or locking position to the raised position as is illustrated in FIG. 3. Other means for detecting misalignment than that illustrated could be used as well as other means for blocking the movement of the cylinder responsive to that detection.

Referring to FIG. 2, it may be seen that the end vehicle has no blocking system, thus, the end vehicle continuously operates causing the end vehicle to move with the ever reversal of pressure upon tubes 56 and 58. The basic system as shown in FIG. 2 is quite simple. I.e., pump 60 pumps hydraulic fluid from reservoir 62 into the outlet pipe 64. The outlet pipe is connected to reversing valve 66. In the present position of the reversing valve, the outlet pipe is connected to what has been designated as the power tube 58. When connected to the power tube 58, fluid is directed to each of the cylinders 32 to move the dogs 28 against the lugs in the power stroke, which is to say, move each of the vehicles 20 forward in the direction of travel T. As shown schematically in FIG. 2, any of the individual pistons in the cylinders 32 may be fully retracted or fully extended, but as additional hydraulic fluid is pumped by the pump 60 into the power tubing 58, they will continue to extend until all of the pistons are fully extended. A pressure relief valve in outlet pipe 64 (not shown in FIG. 2) is set within the design limitations of the pump 60 and limits the maximum pressure applied upon the tubing 56 and 58.

At some time after all of the pistons are fully extended, reversing valve 66 is reversed so the output of the pump 60 is directed to the retract tube 56 and the tube 58 is bled back to the reservoir 62. At this point, it may be seen that all of the cylinders 32 will thereafter retract, which is to say, move so the rod 34 is fully retract. Obviously, if the block 50 is lowered in the block head 54 in any of the vehicles, that cylinder will become fully "retracted" without appreciable movement. After all of the cylinders 32 are retracted, the reversing valve 66 is again reversed.

It will be understood that reversing valve 66 could be reversed by a simple timing mechanism. I.e., every 60 seconds it could be reversed, having previously been determined that 50 seconds is sufficient time for hydraulic fluid to completely fill all the cylinders 32. Of course, if some of the vehicle cylinders are blocked, the excess fluid is bypassed by a pressure relief valve (not shown in FIG. 2) to the reservoir 62.

We prefer to use a system wherein the reversing valve 66 is reversed responsive to an increase in pressure in the output 64 of the pump 60. One embodiment of such a system is shown in FIG. 4.

Figure 4:
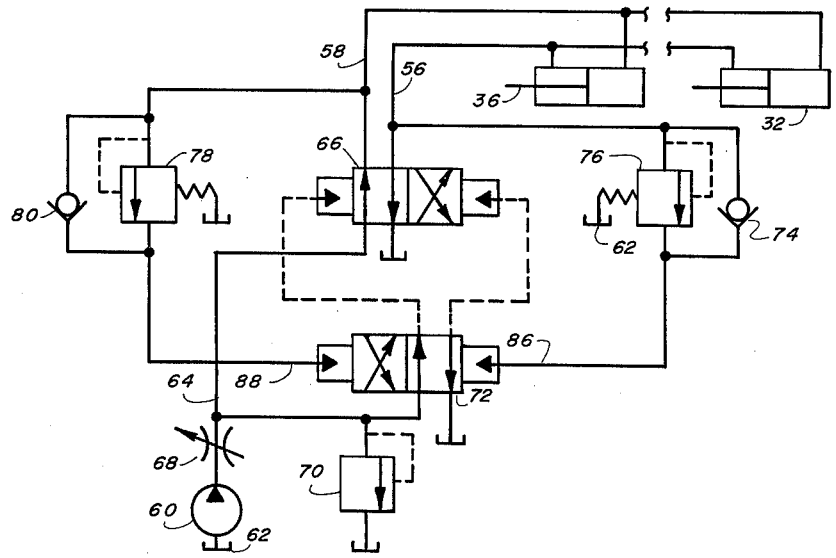
FIG. 4 is a schematic representation showing one embodiment of the method of sequencing the pressure on the hydraulic tubes.

Referring to FIG. 4, it may be seen that flow limiting valve 68 is attached in the outlet 64 of the pump 60 to regulate the speed at which the irrigation system is moved. Pressure limiting valve 70 is attached to the outlet 64 to relieve the excess fluid to the reservoir. As stated before, the outlet pipe 64 is connected to reversing valve 66, which is shown in a position where the fluid from the pump 60 is directed into the power tube 58. The retract tube 56 is shown being directed by the reversing valve 66 back to the reservoir. The outlet pipe 64 is also connected to pilot valve 72 which controls the main reversing valves 66. The pilot valve 72 is controlled by retract pressure control valve 76 connected to retract tube 56 and power pressure control valve 78 connected to power tube 58. Bleed check valve 74 bypasses the retract pressure control valve 76 and bleed check valve 80 bypasses power pressure control valve 78.

Analyzing the operation from the position of the valves as seen in FIG. 4, it may be seen that as the pump 60 continues to operate it will continue to pump fluid through power tube 58 until all of the cylinders 32 become cockablock. At this time the fluid can no longer flow into the cylinders 32 causing the pistons to move and, therefore, the pressure will increase. When the pressure increases, it will cause an increase of pressure on the control valve 78 which will cause it to move to place pressure on power inlet 88 of the pilot valve 72. This pressure increase will cause the pilot valve to reverse. The pilot valve is permitted to reverse by the fluid flowing from the retract inlet 86 through the bleed check valve 74 into the retract tube 56 which in this condition is at low pressure. When the pilot valve 72 reverses, this reverses the pressure upon reversing valve 66 and then reversing valve 66 will reverse. It will be noted that by using the pilot valve 72, there are no dead center positions. I.e., pressure is continually applied through power inlet 88 until the pilot valve 72 has changed positions; then, when it changes position, pressure is then applied to revereseing valve 66. When valve 66 is reversed, pressure will then be applied to retract tube 56 until all of the cylinders 32 are again cockablock in the retracted position at which time the pressure increase on retract tube 56 will cause the retract pressure control valve 76 to apply pressure to the retract inlet 86 at which time the valves are again reversed.

Thus it may be seen, that with the simple reversing valve system as seen in FIG. 4 for an entire system, no valves whatsoever are applied to the cylinders 32 on the vehicles 20. Also, as noted before, although FIG. 4 shows the preferred reversing valve system, other types of pressure reversing systems may be used.

We have found with this particular type system that it is possible to use a mixture of fluids in the lines. The system is basically a "surge" system. The fluid at the end of the tubes 56 and 58 near the end vehicle is never pumped through the pump nor is ever used in the reversing valve systems. Also, there is little fluid flow near the end of the system. Therefore, it is possible to charge the lines with an inexpensive fluid, such as diesel oil or kerosene, in both the retract tube 56 and the power tube 58 and to charge the system with more expensive hydraulic fluids at the pump where it is surged from one line to the other.

By the term "cockablock" is meant that all of the elements have moved as far as possible and the elements, therefore, are capable of moving no further because they are blocked.

It will be understood by those skilled in the art that the individual cylinders 32 could be retracted by means other than the hydraulic fluid in manifold 56. A ready example of the other retracting means would be a spring attached to each cylinder 32 or water pressure from pipe 12 could be used to retract each cylinder 32. A hydraulic pressure much greater than the water pressure would be used to power the cylinders 32 in manifold 58, readily overcoming the water pressure.

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:

1. In an agricultural irrigation system having
    a. an elongated pipe adapted to carry a plurality of sprinklers and adapted to carry water under pressure,
    b. a plurality of vehicles movingly supporting said pipe,
    c. alignment means attached to each vehicle for detecting misalignment of each vehicle,
    d. a fluid power cylinder on each vehicle,
    e. drive means on each vehicle for driving the vehicle responsive to movement of the power cylinder,
    f. the improvement in combination with the above comprising:
    g. a power tube connected to all the cylinders,
    h. a retract means connected to all the cylinders for retracting same after they have been extended,
    j. reversing means connected to the power tube for alternately supplying pressurized fluid to the power tube, and
    k. blocking means on each vehicle for blocking the movement of the cylinder on that vehicle responsive to detected misalignment of that vehicle.

2. The invention as defined in claim 1 with an additional limitation of
    m. pressure control means connected to the power tube for operating said reversing means.

3. In an agricultural irrigation system having
    a. an elongated pipe adapted to carry a plurality of sprinklers and adapted to carry water under pressure,
    b. a plurality of vehicles movingly supporting said pipe,
    c. alignment means attached to each vehicle for detecting misalignment of each vehicle,
    d. a fluid power cylinder on each vehicle, each cylinder having two sides,
    e. drive means on each vehicle for driving the vehicle responsive to movement of the power cylinder,
    f. the improvement in combination with the above comprising:
    g. a power tube connected to one side of all the cylinders,
    h. a retract tube connected to the other side of all the cylinders,
    j. a pump having an outlet,
    k. reversing valve means for alternately connecting the outlet of the pump to the power and retract tubes.

4. The invention as defined in claim 3 with an additional limitation of
    m. pressure control means connected to the power and retract tubes for operating said reversing valve means.

5. The invention as defined in claim 3 with an additional limitation of
    m. blocking means on each vehicle for blocking the movement of the cylinder on that vehicle responsive to detected misalignment of that vehicle.

6. The invention as defined in claim 5 with an additional limitation of
    n. pressure control means connected to the power and retract tubes for operating said reversing valve means.

7. The invention as defined in claim 5 wherein said reversing valve means includes:
    n. a pilot valve connected to the pump outlet,
    o. a power pressure control valve in the power tube connected to the pilot valve,
    p. a retract pressure control valve in the retract tube connected to the pilot valve, and
    q. a reversing valve connected to the pump outlet and to the pilot valve,
    r. the power and retract tubes connected to the reversing valve.

8. In an agricultural irrigation system having
    a. an elongated pipe adapted to carry a plurality of sprinklers and adapted to carry water under pressure,
    b. a plurality of vehicles movingly supporting said pipe,
    c. alignment means attached to each vehicle for detecting misalignment of each vehicle,
    d. a fluid power cylinder on each vehicle, each cylinder having two sides,
    e. drive means on each vehicle for driving the vehicle responsive to movement of the power cylinder,
    f. the improved method comprising:
    g. supplying fluid under pressure to one side of all of the cylinders until all the cylinders have moved as far as permitted, then
    h. reversing the fluid and
    j. supplying fluid under pressure to the other side of all the cylinders until all the cylinders have moved as far as permitted, and
    k. blocking the movement of the cylinder on any vehicle which is forward of alignment.

9. The invention as defined in claim 8 wherein
    m. the reversing step is responsive to the amount of the pressure of the fluid supplied to the cylinders.

* * * * *